United States Patent
Li

(10) Patent No.: US 10,320,725 B1
(45) Date of Patent: Jun. 11, 2019

(54) METHOD AND APPARATUS AND ELECTRONIC DEVICE FOR INTEGRATING MULTIFUNCTIONAL SERVICES

(71) Applicant: Shiwei Li, Shatin (HK)

(72) Inventor: Shiwei Li, Shatin (HK)

( * ) Notice: Subject to any disclaimer, the term of this patent is extended or adjusted under 35 U.S.C. 154(b) by 0 days.

(21) Appl. No.: 16/137,965

(22) Filed: Sep. 21, 2018

Related U.S. Application Data

(60) Provisional application No. 62/659,262, filed on Apr. 18, 2018, provisional application No. 62/659,268, filed on Apr. 18, 2018, provisional application No. 62/659,274, filed on Apr. 18, 2018, provisional application No. 62/659,279, filed on Apr. 18, 2018, (Continued)

(30) Foreign Application Priority Data

| Jun. 13, 2018 | (CN) | 2018 1 0608658 |
| Jun. 13, 2018 | (CN) | 2018 1 0608659 |
| Jun. 13, 2018 | (CN) | 2018 1 0608671 |
| Jun. 13, 2018 | (CN) | 2018 1 0610187 |
| Jun. 13, 2018 | (CN) | 2018 1 0610189 |
| Jun. 13, 2018 | (CN) | 2018 1 0611025 |
| Jun. 13, 2018 | (CN) | 2018 1 0611056 |

(51) Int. Cl.
    *H04L 12/58* (2006.01)
    *G06F 3/0481* (2013.01)
    *H04N 7/14* (2006.01)

(52) U.S. Cl.
    CPC ........ *H04L 51/046* (2013.01); *G06F 3/04817* (2013.01); *H04L 51/32* (2013.01); *H04N 7/141* (2013.01)

(58) Field of Classification Search
    CPC ............ G06F 3/04817; G06F 3/04842; G06F 3/0486; G06Q 10/10; G06Q 30/0643; G06Q 30/02; G06Q 30/0226; G06Q 30/0236; G06Q 30/0239; H04L 12/1822; H04L 51/32; H04M 1/274508; H04M 1/27455
    USPC ....... 379/93.04, 93.05, 93.07, 93.09, 100.01, 379/100.06; 348/14.03, 14.07, 14.08, 348/14.09, 14.11
    See application file for complete search history.

(56) References Cited

U.S. PATENT DOCUMENTS 9,497,565 B1 * 11/2016 Zha ................... H04W 4/21
9,900,280 B2 *  2/2018 Geppert ............. G06F 3/04817
(Continued)

*Primary Examiner* — Binh Kien Tieu
(74) *Attorney, Agent, or Firm* — Locke Lord LLP; Tim Tingkang Xia, Esq.

(57) ABSTRACT

The invention provides method, apparatus and electronic device for integrating multifunctional services. The method includes assigning users with corresponding user identification numbers in an interactive application platform; responding to the login operation of the user based on the user identification number, and displaying the personal homepage of the user after login is successful; after detecting a click operation of the user on the audio and video communication label, entering an audio and video communication interface; and when the user identification number of another user input by the user on a dialing sub-interface is received, initiating a communication request to the another user based on the user identification number, or when the click operation on a communication key arranged on the audio and video communication interface is detected, initiating a communication request to another user to which the communication key corresponds.

11 Claims, 6 Drawing Sheets

Related U.S. Application Data provisional application No. 62/659,285, filed on Apr. 18, 2018, provisional application No. 62/659,289, filed on Apr. 18, 2018, provisional application No. 62/659,292, filed on Apr. 18, 2018, provisional application No. 62/659,297, filed on Apr. 18, 2018.

(56) References Cited

U.S. PATENT DOCUMENTS

| | | | |
|---|---|---|---|
| 2008/0249863 A1* | 10/2008 | Redmond | G06Q 10/10 705/14.27 |
| 2010/0251119 A1* | 9/2010 | Geppert | G06F 3/04817 715/716 |
| 2011/0154291 A1* | 6/2011 | Hoover | G06Q 30/02 717/120 |
| 2016/0156682 A1* | 6/2016 | Jeon | H04L 65/1069 709/204 |
| 2016/0162984 A1* | 6/2016 | Shen | G06Q 30/0643 705/27.2 |
| 2016/0316312 A1* | 10/2016 | Zha | H04W 4/21 |
| 2017/0339264 A1* | 11/2017 | Steel | H04M 1/274508 |

\* cited by examiner

METHOD AND APPARATUS AND ELECTRONIC DEVICE FOR INTEGRATING MULTIFUNCTIONAL SERVICES

CROSS-REFERENCE TO RELATED PATENT APPLICATIONS

This application claims priority to and the benefit of, pursuant to 35 U.S.C. § 119(e), U.S. Provisional Patent Application Nos. 62/659,262, 62/659,268, 62/659,274, 62/659,279, 62/659,285, 62/659,289, 62/659,292, and 62/659,297, all filed Apr. 18, 2018, which are incorporated herein in their entireties by reference.

This application also claims priority to and the benefit of, pursuant to 35 U.S.C. § 119(a), Chinese Patent Application Nos. 201810610187.5, 201810608659.3, 201810608671.4, 201810611056.9, 201810611025.3, 201810608658.9, and 201810610189.4, all filed Jun. 13, 2018, in the State Intellectual Property Office of P.R. China, which are incorporated herein in their entireties by reference.

FIELD OF THE INVENTION

The invention relates generally to information processing, and more particularly to method and apparatus, and electronic device for integrating multifunctional services.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

At present, when an interactive application platform combines the social network with an integrated communication mode including network telephone and instant messaging, an interaction mode based on user names in the prior art is inconvenient. Moreover, existing application programs can only realize a single function and users need to switch among multiple applications with different functions so as to realize different interactive functions, and therefore, a lot of inconvenience is brought to interactive operations.

Therefore, a heretofore unaddressed need exists in the art to address the aforementioned deficiencies and inadequacies.

SUMMARY OF THE INVENTION

In view of the foregoing, one of the objectives of the present invention is to provide method and apparatus, and electronic device for integrating multifunctional services.

In one aspect, the present invention provides a method for integrating multifunctional services, which is operably applied to the electronic device with an integrative application platform.

In one embodiment, the method for integrating multifunctional services comprises assigning users with corresponding user identification numbers in the interactive application platform, wherein the user identification number comprises multiple digital numbers; when the login operation of the user based on the user identification number is detected, responding to the login operation, and displaying the personal homepage of the user after login is successful, wherein the personal homepage comprises a social information label, an instant messaging label, an audio and video communication label and an email label; after detecting a click operation of the user on the audio and video communication label, entering an audio and video communication interface; and when the user identification number of another user input by the user on a dialing sub-interface in an audio and video communication interface is received, initiating a communication request to the another user based on the user identification number, or when the click operation of the user on a communication key arranged on the audio and video communication interface is detected, initiating a communication request to another user to which the communication key corresponds.

In one embodiment, the interactive application platform comprises multiple users; each of the users is mapped to a dendritic structure system which is established according to an interior administrative management relationship of an organization in which each of the users is located, wherein the user identification number includes a first number segment, a second number segment and a third number segment. The step of initiating a communication request to another user based on the user identification number when the user identification number of the another user input by the user on a dialing sub-interface in the audio and video communication interface is received comprises when the user and the another user are located in the same dendritic structure system, receiving the third number segment of the user identification number of the another user input by the user on the dialing sub-interface in the audio and video communication interface, and initiating a communication request to the another user based on the third number segment; and when the user and the another user are located in different dendritic structure systems, receiving the second number segment and third number segment of the user identification number of the another user input by the user on the dialing sub-interface in the audio and video communication interface, and initiating a communication request to the another user based on the second number segment and third number segment.

In one embodiment, the interactive application platform comprises multiple users; the personal homepage related to each of the users is mapped to the dendritic structure system which is established according to the interior administrative management relationship of the organization in which each of the users is located. The method further comprises when the click operation of the user on the social information label in the personal homepage is detected, jumping to a social information interface; receiving shared information input by the user and an information visibility type selected by the user on the social information interface; and setting the shared information to be visible to at least a portion of users in the dendritic structure system according to the information visibility type, and/or pushing the shared information to at least a portion of users in the dendritic structure system.

In one embodiment, the method further comprises when the click operation of the user on an organization structure label in the social information interface is detected, displaying the dendritic structure system comprising multiple nodes, wherein the relationship among the multiple nodes is the mapping of the interior administrative management relationships of multiple users in the organizations in which the multiple users are located; receiving the control operation of the user on the nodes in the dendritic structure system and the selected target node, wherein the control operation is a movement operation or relating operation; and moving or relating the personal homepage and a subordinate homepage related to the nodes to the personal homepage of the target node according to control operation.

In one embodiment, the method further comprises after detecting the click operation of the user on the instant messaging label, entering an instant messaging list page, wherein the instant messaging list page comprises an instant messaging record icon and a contact icon, and the instant messaging list page displays when the instant messaging record icon is in a click state; and after detecting the click operation on the contact icon, displaying the dendritic structure system comprising multiple nodes, which is mapped by an organization in which the user is located, the dendritic structure systems to which other organizations correspond, and other personal users.

In one embodiment, the instant messaging list page further comprises a friend addition icon and a personal information icon. The method further comprises after detecting the click operation of the user on the friend addition icon, starting identification code scanning equipment, and after successfully scanning the identification code of another user, issuing a friend addition request to the another user; or after detecting the click operation of the user on the personal information icon, displaying the personal information label of the user, wherein the personal information label comprises a personal business card option; and receiving the operation of the user on the personal business card option, and displaying the identification code of the user.

In one embodiment, the method further comprises after detecting the click operation of the user on the email label, entering an email receiving and sending interface; and receiving the mail information input by the user and a mail receiving and sending type selected by the user on the email receiving and sending interface, and sending the mail information to a target postal communication user according to the mail receiving and sending type.

In one embodiment, the mail receiving and sending types comprise an unaddressed postal communication type and an addressed postal communication type. The step of sending the mail information to the target postal communication user according to the mail receiving and sending type comprises: when the mail receiving and sending type is the addressed postal communication type, obtaining a postal communication address input on the email receiving and sending interface, and sending the mail information to the target postal communication user to which the postal communication address corresponds; and when the mail receiving and sending type is the unaddressed postal communication type, sending the mail information to the target postal communication user according to the personal business card of the target postal communication user selected by the user or a mail receiving and sending link in the personal homepage of the user.

In another aspect, the present invention further provides an apparatus for integrating multifunctional services, which is applied to an electronic device with the alternative application platform. In one embodiment, apparatus comprises a user identification number allocation module used for assigning users with corresponding user identification numbers in the interactive application platform, wherein the user identification number comprises multiple digital numbers; a personal homepage displaying module used for responding to the login operation when the login operation of the user based on the user identification number is detected, and displaying the personal homepage of the user after login is successful, wherein the personal homepage comprises a social information label, an instant messaging label, an audio and video communication label and an email label; a detecting module used for entering an audio and video communication interface after detecting a click operation of the user on the audio and video communication label; and a communication request sending module used for initiating a communication request to another user based on the user identification number when the user identification number of the another user input by the user on a dialing sub-interface in the audio and video communication interface is received, or initiating a communication request to another user to which the communication key corresponds when the click operation of the user on a communication key arranged on the audio and video communication interface is detected.

In yet another aspect, the present invention further provides electronic device which comprises a processor and a machine-readable storage medium. The machine-readable storage medium stores machine executable instructions which can be executed by the processor, and the processor executes the machine executable instructions so as to implement the method.

In a further aspect, the present invention also provides a non-transitory computer-readable storage medium storing programs and/or instruction codes. The programs and/or instruction codes, when executed by one or more processors, cause the above method for integrating multifunctional services to be performed.

According to the method for integrating multifunctional services and device, and the electronic device provided by the embodiments of the present application, the interaction among platform users is more convenient by assigning the user identification numbers to the users in the interactive application platform and using the user identification numbers as a basis for the user to login to the platform and interact with other users in the platform. In addition, multiple different business functions are integrated into the interactive application platform according to the present application, so that multiple different information interaction can be realized among the users, and the disadvantage of the prior art that switching among multiple applications with different functions is needed to realize different interactive functions is avoided.

To make the foregoing objectives, features and advantages of the present invention easier to understand, these and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

To describe the technical solutions of the embodiments of the present invention more clearly, the following briefly introduces the accompanying drawings required for describing the embodiments. It shall be understood that the accompanying drawings in the following description show only some embodiments of the present invention and do not constitute a limitation to the scope, and those of ordinary skill in the art may still derive other drawings from these accompanying drawings without creative efforts.

Figure 1:
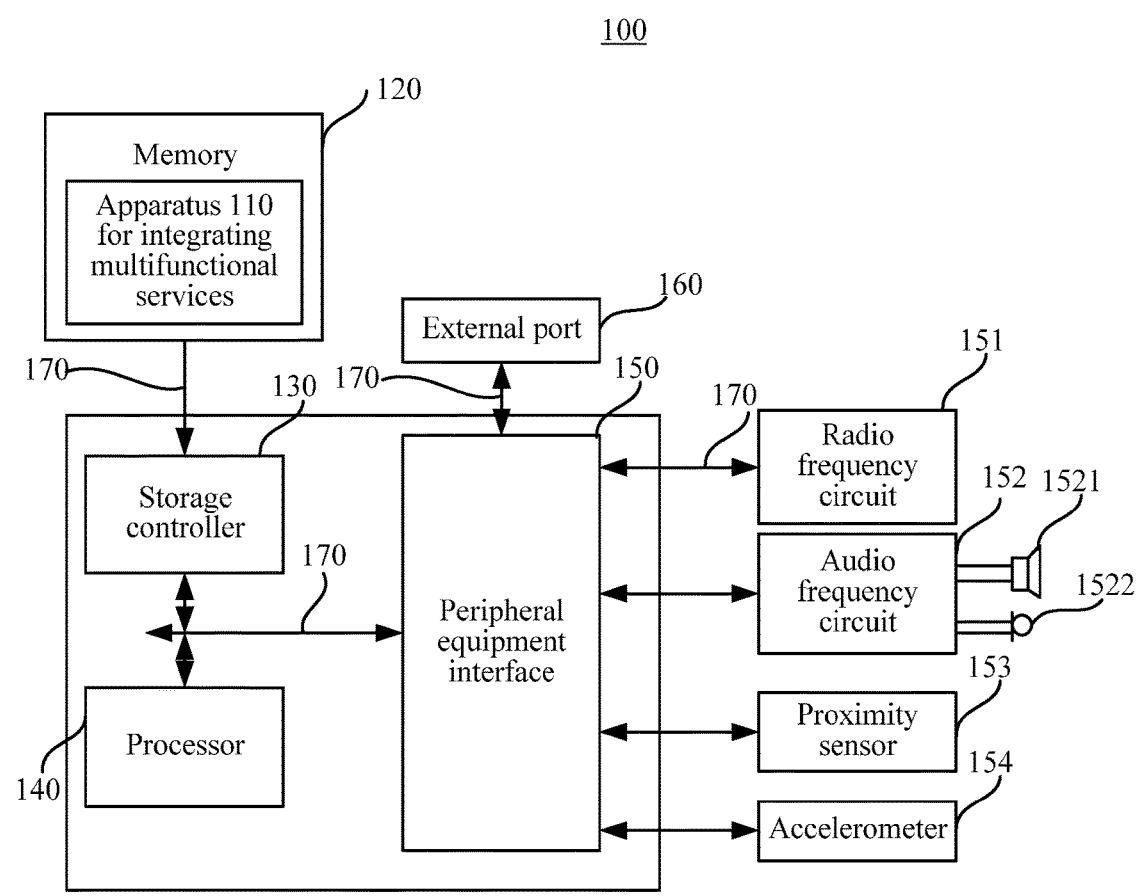
FIG. 1 is a structure block diagram of the electronic device according to one embodiment of the present application.

Listing of reference numerals: 100, electronic device; 110, apparatus for integrating multifunctional services; 111, user identification number allocation module; 112, personal homepage display module; 113, detection module; 114, communication request sending module; 120, memory; 130, storage controller; 140, processor; 150, peripheral equipment interface; 151, radio frequency circuit; 152, audio frequency circuit; 1521, loudspeaker; 1522, microphone; 153, proximity sensor; 154, accelerometer; 160, external port; and 170, signal line.

DETAILED DESCRIPTION OF THE INVENTION

The invention will now be described more fully hereinafter with reference to the accompanying drawings, in which exemplary embodiments of the invention are shown. The invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the invention or of any exemplified term. Likewise, the invention is not limited to various embodiments given in this specification.

The terminology used herein is for the purpose of describing particular embodiments only and is not intended to be limiting of the invention. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprise(s)" and/or "comprising," or "include(s)" and/or "including" or "has (have)" and/or "having" or "contain(s)" and/or "containing" when used in this specification specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used herein, the phrase at least one of A, B, and C should be construed to mean a logical (A or B or C), using a non-exclusive logical OR. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The terms "chip" or "computer chip", as used herein, generally refer to a hardware electronic component, and may refer to or include a small electronic circuit unit, also known as an integrated circuit (IC), or a combination of electronic circuits or ICs.

As used herein, the term "server" generally refers to a system (e.g., a social network server) that responds to requests across a computer network to provide, or help to provide, network services, e.g., network data storage and database management. A server may also include one or more processors to execute computer programs in parallel. An implementation of the server may include software and suitable computer hardware. A server may run on a computing device or a network computer. In some cases, a computer may provide several services and have multiple servers running.

The terms "client" or "client terminal", or "terminal", as used herein, refer to any appropriate user terminal with certain computing capabilities, e.g., a personal computer (PC), a work station computer, a hand-held computing device (e.g., a tablet), a mobile terminal (e.g., a mobile phone or a smart phone), or any other user-side computing devices.

The invention in one aspect relates to methods, apparatuses, and/or electronic devices for integrating multifunctional services. One of ordinary skill in the art would appreciate that, unless otherwise indicated, certain computer systems and/or components thereof may be implemented in, but not limited to, the forms of software, firmware or hardware components, or a combination thereof.

The apparatuses, systems, and/or methods may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The apparatuses, systems, and/or methods may be illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

FIG. 1 is a structure schematic diagram of the electronic device 100 comprising a touch screen according to one embodiment of the present application. In the exemplary embodiment, the electronic device 100 with the touch screen may comprise, for example, a smartphone, a touch PDA (personal digital assistant) or a tablet computer, or a computer with a touch screen function.

The electronic device 100 comprises a memory 120 (optionally comprises one or more computer readable storage mediums), a storage controller 130, one or more processors 140 (CPU), a peripheral equipment interface 150, a radio frequency circuit 151, an audio frequency circuit 152, a loudspeaker 1521, a microphone 1522 and an external port 160, a proximity sensor 153 and an accelerometer 154. The components communicate optionally through one or more communication buses or signal lines 170.

The apparatus for integrating multifunctional services 110 comprises at least one software function module which can be stored in the memory 120 in the form of software or firmware or solidified in the operating system of the electronic device 100. The processor 140 accesses the memory 120 under the control of the storage controller 130 so as to execute an executable module stored in the memory 120, such as a software function module and an computer program included in the apparatus for integrating multifunctional services 110.

It should be understood that the structure shown in FIG. 1 is only schematic, namely, the electronic device 100 may comprise more or less components than that shown in FIG. 1, or have a configuration different from that shown in FIG. 1. The components shown in FIG. 1 can be implemented by software, hardware, or combination of software and hardware.

In another aspect, the invention also provides a non-transitory computer-readable storage medium storing programs and/or instruction codes. The programs and/or instruction codes, when executed by one or more processors, cause the following methods for integrating multifunctional services to be performed.

Figure 2:
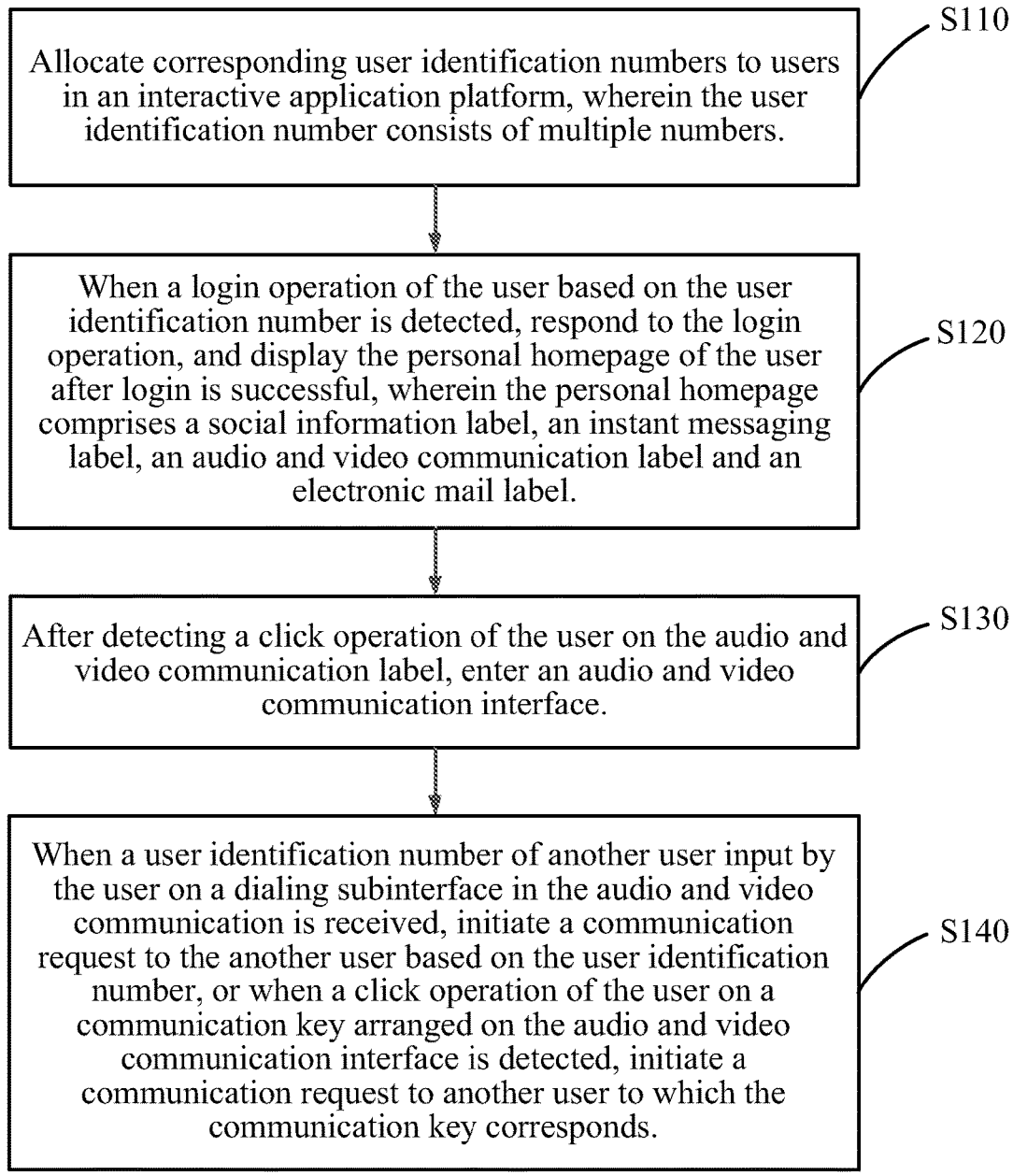
FIG. 2 is a flow diagram of the method for integrating multifunctional services according to one embodiment of the present application.

Referring to FIG. 2, the embodiment of the present invention further provides a method for integrating multifunctional services, which can be applied to the electronic device 100. The steps defined by the process related to the method can be realized by the processor 140, which are elaborated below in details.

Step 110, assigning users with corresponding user identification numbers in an interactive application platform, wherein the user identification number comprises multiple digital numbers.

At present, user names are commonly used by the public in social networks, and user numbers are rarely used in social networks. But when the social networks are combined with an integrated communication mode including network telephone and instant messaging, it's useful to use a digital keyboard for dialing that people are used to. Therefore, according to the embodiment, the user identification numbers are assigned to the users in the interactive application platform, serve as interaction basis and may consist of multiple digital numbers.

In certain embodiment, the user identification numbers are generated according to certain rules, and can be generated according to identification number generation modes selected by the users. The identification number generation modes comprise a user type based generation mode, an existing number based generation mode, a time period based generation mode and the like. According to the user type based generation mode, the users are mainly divided into three types of users including public users, college graduates users and organization users. According to the existing number based generation mode, existing numbers may be mobile phone numbers of the users. According to the time period based generation mode, a system can provide different number groups for the users in different time periods. In the embodiment, the user identification numbers obtained according to the user type based generation mode and the time period based generation mode are composed of two parts. The user identification number is composed of multiple digital numbers, such as 12 numbers or 13 numbers. In the embodiment, the user identification number is set to be composed of 12 numbers. The first part of the user identification number is the number group comprising four numbers, and the second part is the number group comprising eight numbers, wherein the first part is set as the first number segment, the first four numbers of the second part are set as the second number segment, and the last four numbers of the second part are set as the third number segment. In the embodiment, different first number segments can be assigned to the users according to the types of the users. For example, 4000 is assigned to the first number segment of the organization users, 2000 is assigned to the first number segment of the college graduates users, and 1000 is assigned to the first number segment of the public users. The second number segment and the third number segment can be set independently according to the user's wishes.

In the embodiment, when the allocation of the user identification numbers is performed, if the current user is a public user or a college graduate user, the electronic device 100 responds to the registration request of the user of this type, generates the corresponding user identification number according to the above generation rules, and assigns the generated user identification number to the user of this type. If the current user is an organization user and the organization user is located in the dendritic structure system which is established according to the interior administrative management relationship of the organization in which the organization user is located, the electronic device 100 can respond to the operation request of a superior user of the organization user for assigning the user identification number to the organization user so as to assign one user identification number in the identification number group of the superior user to the organization user. Step 120, when the login operation of the user based on the user identification number is detected, responding to the login operation, and displaying the personal homepage of the user after login is successful, wherein the personal homepage comprises a social information label, an instant messaging label, an audio and video communication label and an email label.

In the embodiment, the user identification number can be used as an identifier for the user to log in to the interactive application platform. After the electronic device 100 receives the login request of the user based on the user identification number and the user login is successful, the electronic device 100 enters the personal homepage of the user. In one embodiment, the personal homepage of the user comprises the social information label, the instant messaging label, the audio and video communication label and the email label. The user can enter a social module by clicking on the social information label in order to realize social operations such as information viewing and information releasing, can also realize instant messaging with another user in the platform by clicking on the instant messaging label, or realize audio and video communication with another user by clicking on the audio and video communication label, or realizes receiving and sending of emails and other related functions by clicking on the email label.

Step 130, after detecting a click operation of the user on the audio and video communication label, entering an audio and video communication interface.

Step 140, when the user identification number of another user input by the user on a dialing sub-interface in the audio and video communication interface is received, initiating a communication request to the another user based on the user identification number, or when the click operation of the user on a communication key arranged on the audio and video communication interface is detected, initiating a communication request to another user to which the communication key corresponds.

In the embodiment, after the click operation of the user on the audio and video communication label is detected, the audio and video communication interface is entered. The audio and video communication interface comprises a collection icon, a recent call icon, an address book icon, a dialing keyboard icon and other icons. After the electronic device 100 detects the click operation of the user on the dialing keyboard icon, a dialing sub-interface is displayed.

The user can input the user identification number of a communication peer through the dialing sub-interface. When the electronic device 100 receives the user identification number of another user input by the user on the dialing sub-interface, the electronic device 100 initiates a communication request to the another user based on the user identification number, wherein the communication request may be an audio communication request or a video communication request.

In the embodiment, the interactive application platform comprises multiple users; the organization user may be mapped to a dendritic structure system which is established according to the interior administrative management relationship of an organization in which the organization user is located. As disclosed the above, the user identification number comprises a first number segment, a second number segment and a third number segment. When the user is in audio and video communication with another user by means of dialing, if the user initiating a communication request and the another user receiving communication are located in the same dendritic structure system, the third number segment of the user identification number of the another user input by the user on the dialing sub-interface in the audio and video communication interface can be received. The communication request is initiated to the another user based on the third number segment.

If the user initiating a communication request and the another user receiving communication are located in the different dendritic structure systems, the second number segment and third number segment of the user identification number of the another user input by the user on the dialing sub-interface in the audio and video communication interface are received, and the communication request is initiated to the another user based on the second number segment and the third number segment.

In addition, if another user receiving communication is not in the dendritic structure system, a complete user identification number of the another user needs to be entered in order to successfully initiate a communication request to the another user.

Furthermore, the contact information collected by the user is stored in a collection icon list, so that the user can initiate a communication request with a target contact by selecting the target contact directly from the collection list. In addition, the collection list further comprises a collection addition icon, so that the user can enter an addition interface through the collection addition icon so as to newly add collected contact information. In addition, the user can view the detailed information page of the collected contact, such as the name and avatar of the contact; and the user can initiate instant messaging, audio communication, video communication, receiving and sending of the emails and other interaction with the contact in the detailed information page. For example, the user can initiate audio communication or video communication with the contact by clicking on the user identification number of the contact in the detailed information page, namely, a communication press key.

In one embodiment, the call records of the user can be viewed by clicking on the latest call icon in the audio and video communication interface and include all call records and missed call records. The user can initiate a call to a corresponding side to which the call record corresponds. In addition, an edit link is also set on a call record interface, so that the user can enter the edit interface for deletion or full clearance of the call records through the edit link so as to realize the corresponding editing of the call records.

In one embodiment, a detailed information page link of a contact with a call record is also set in each call record on the call record interface. The user can enter the detailed information page of the contact through the link. The detailed information page comprises the name and avatar of the contact and the like. In addition, the user can initiate instant messaging, audio communication, video communication, receiving and sending of the emails and the like with the contact in the detailed information page. The user can initiate audio and video communication with the contact by clicking on the user identification number of the contact in the detailed information page. In addition, the past call records between the user and the contact are also listed in the detailed information page. If the related contact is not a member of the address book of the user, the related contact can be added to the address book.

The address book of the user can be viewed under the address book icon of the audio and video communication interface. If the user is an organization user, the interior administrative management relationship of the organization in which the organization user is located can be mapped to a dendritic structure system. In the address book of the user, the contacts of different departments and posts are displayed in a dendritic hierarchy manner.

Figure 3:
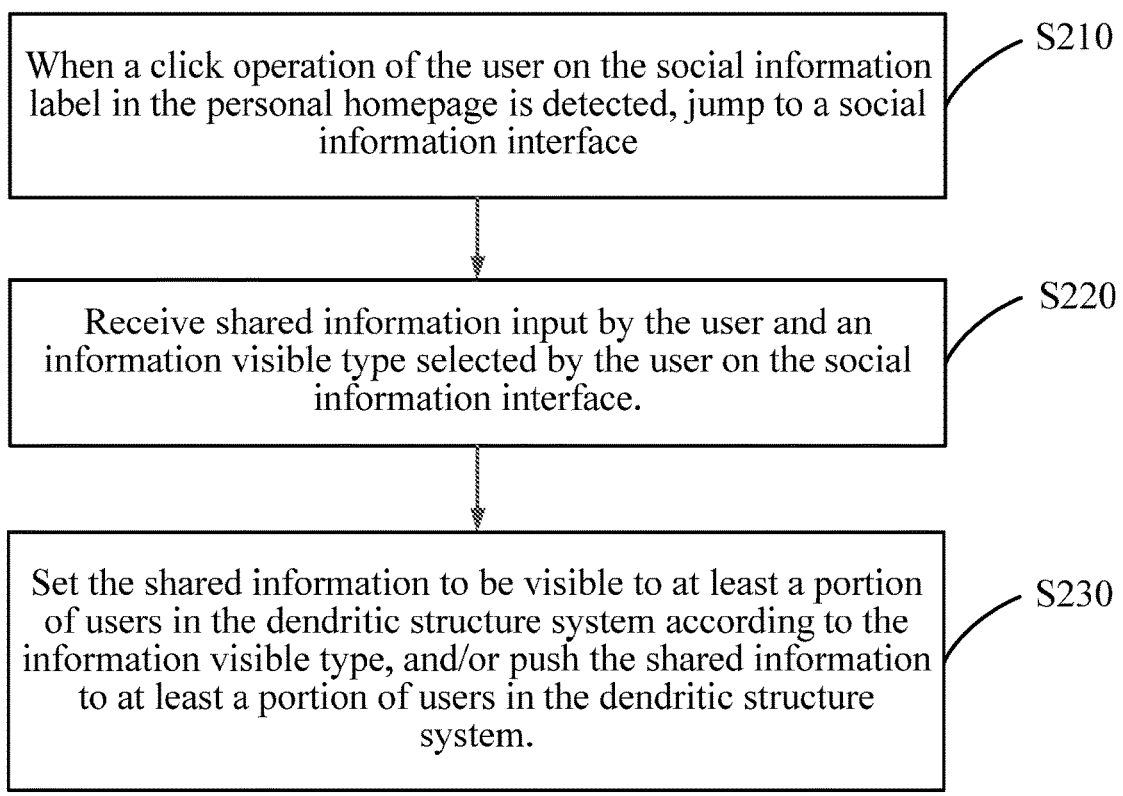
FIG. 3 is a flow diagram of the method for integrating multifunctional services according to another embodiment of the present application.

In one embodiment, referring to FIG. 3, the method for integrating multifunctional services further comprises the following steps of:

Step 210, when the click operation on the social information label in the personal homepage by the user is detected, jumping to a social information interface.

Step 220, receiving shared information input by the user and an information visibility type selected by the user on the social information interface;

Step 230, setting the shared information to be visible to at least a portion of users in the dendritic structure system according to the information visibility type, and/or pushing the shared information to at least a portion of users in the dendritic structure system.

In the embodiment, after the click operation on the social information label in the personal homepage by the user is detected, the social information interface appears. The social information interface can display the social information of the user, such as shared information published by the user and the comments of the user. In one embodiment, the search information entered by the user in a search box can also be received so as to display the corresponding search content.

In the embodiment, the user can publish the shared information in the social information interface and can also set visibility according to demands. In one embodiment, the electronic device 100 receives the shared information input by the user and the information visibility type selected by the user on the social information interface. According to the information visibility types, information can be visible to all the users on the platform, and/or is pushed to the personal homepage of the subordinate node of the user and other users located outside the organization in which the user is located, or is visible to users located inside the organization in which the user is located, and/or is pushed to the personal homepage of the subordinate node of the user, or is visible to users of all superior nodes and inferior nodes on a node path of the user, and/or is pushed to the users of the inferior node. In addition to the above visibility types, other types can also be set according to the requirements of the user without specific restrictions in the embodiment.

So, the electronic device 100 can set the shared information released by the user to be visible to at least a portion of corresponding users in the dendritic structure system according to the visibility type set by the user, and/or pushes the shared information to at least a portion of the users in the dendritic structure system.

In addition, the user can also view all kinds of information related to himself on the homepage of the social information interface, such as social dynamic information, business cards, organizational structures, shared pictures, videos, recruitment information, product information, purchasing information, financial investment information, activity information, blogs and attention information. For example, the user can view dynamic information published by the themselves in the social information interface in the dynamic page of the homepage, and can enjoy, comment and share dynamic information. The business card item can be used for viewing the business card of the organization to which the user belongs, including the subject terms, brief introduction, industry, nature and the like of the organization. The content of the business card can also be edited and modified through the business card item.

The organizational structure of the organization to which the user belongs can be viewed through the organizational structure item. In one embodiment, when the electronic device 100 detects the click operation on the organizational structure label in the social information interface by the user, the dendritic structure system comprising multiple nodes is displayed; and the relationship among the multiple nodes is the mapping of the interior administrative management relationships of multiple users in the organizations in which the multiple users are located;

The control operation on the nodes in the dendritic structure system by the user and the selected target node are received. The control operation is a movement operation or relating operation. The personal homepage and a subordinate homepage related to the nodes are moved or related to the personal homepage of the target node according to control operation. It shall be noted that in the embodiment, only the organization users with operational authority can move or relate the nodes in the dendritic structure. The organization users with operational authority may be top-level node users of the dendritic structure system, or certain node users at higher levels which are selected by the top-level node users and to which the operational authority is granted, without any specific restrictions in the embodiment.

In addition, the user can view uploaded photographs and created photograph albums as well as uploaded videos and the like. The user can conveniently click on any photographs to see details, including photograph names, introduction and some quick actions. In the photograph album interface, the user can click on the corresponding addition icon so as to create a new photograph album. In one embodiment, the user can also view positions which have been published, refresh the position information, pause the publishing of the positions, and view the positions and the related details of the positions on the social information interface. If the user is a job publisher, the user can click on resumes so as to view received resumes, and can also view the details of the resumes. In the resume detail page, the user can realize instant messaging, audio and video communication and sending and receiving of the emails respectively with the resume deliver by clicking on the instant messaging icon, audio and video communication icon and email sending and receiving icon of the resume deliverer.

Moreover, the user can also view published product information and product details, and display product names, product pictures, product prices, product details, product specifications, relevant products and the like in the product detail page. If the user is a visitor, the user can also initiate instant messaging, audio and video communication, and receiving and sending of emails with the product publisher.

In one embodiment, the user can also view published financing/investment projects as well as corresponding details. For example, the detail page can display the names of the financing projects, project pictures, videos or PPT (Power Point), project summary, industry fields, regions, project introduction and the like. The detail page can also display the names, pictures, investment industries, investment amount, investment ways, capital types, investment stages, regions, project overview and cases of the investment projects and the like. If the user is a visitor, the user can also realize instant messaging, audio and video communication, and email sending and receiving with a financing investor.

Furthermore, the user can also view published purchased items and obtain details thereof. The detail page displays the names, pictures, brands, producing areas or manufacturers, purchasing quantity, qualification requirements, quality specification and contact information of the purchased items. If the user is a visitor, the user can also realize instant messaging, audio and video communication, receiving and sending of the emails with the purchasing publisher. The user can also leave a message or quote for the purchasing by clicking on a "message/quotation" icon.

In addition, the user can also view groups he managed and groups he have joined, and can also create groups. The user can also view activity announcement and past actives and view activity details by clicking. The user can view published blogs and the details of the blogs. In addition, the user can also view the followers of own personal homepage and the personal pages of other users which are followed by the user.

Figure 4:
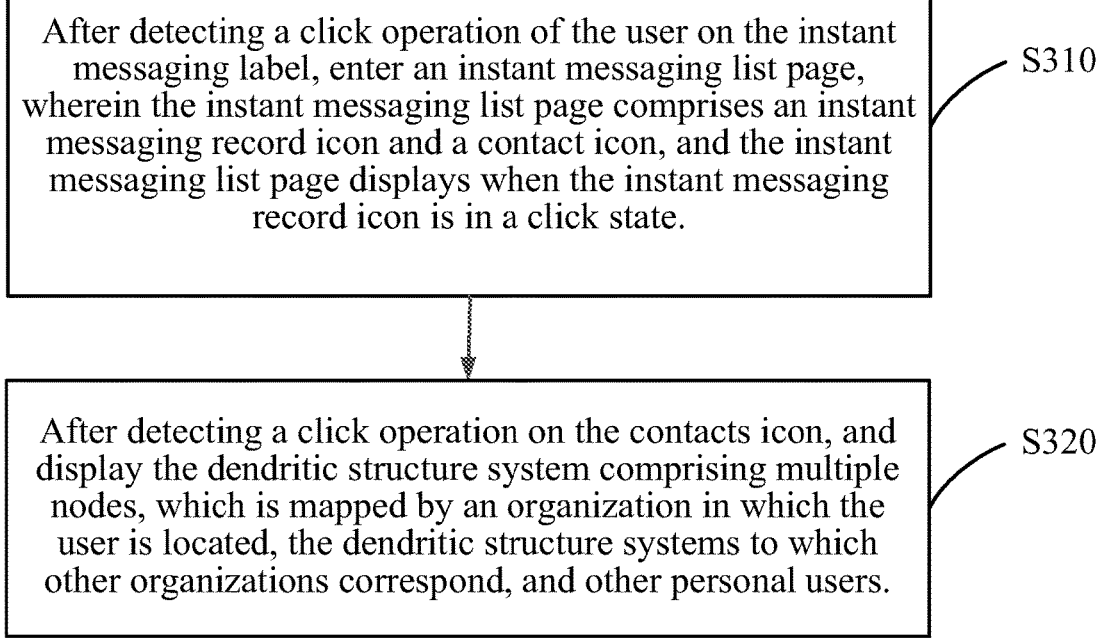
FIG. 4 is another flow diagram of the method for integrating multifunctional services according to one embodiment of the present application.

In one embodiment, referring to FIG. 4, the method for integrating multifunctional services further comprises the following steps of:

Step 310, after detecting the click operation on the instant messaging label by the user, entering an instant messaging list page, wherein the instant messaging list page comprises an instant messaging record icon and a contact icon, and the instant messaging list page displays when the instant messaging record icon is in a clicking state;

Step 320, after detecting the click operation on the contact icon, displaying the dendritic structure system comprising multiple nodes, which is mapped by an organization in which the user is located, the dendritic structure systems to which other organizations correspond, and other personal users.

In the embodiment, after the electronic device 100 detects the click operation on the instant messaging label in the personal homepage by the user, an instant messaging label page is entered. The instant messaging label page comprises an instant messaging record icon and a contact icon, and the instant messaging list page displays when the instant messaging record icon is in a clicking state. The total number of current unread messages and the number of unread messages of the contact currently communicating can be displayed in the instant messaging list page. The instant messaging list page displays the latest conversion records. A chat page can be entered by clicking on any conversation record. The user can view the detailed chat record of the conversation. In addition, the audio and video communication between the user and an interlocutor can be quickly initiated in the interface, and the chat records can be copied, forwarded, collected and the like.

After the electronic device 100 detects the click operation on the contact icon by the user, the dendritic structure system comprising multiple nodes, which is mapped by the organization in which the user is located, the dendritic structure systems to which other organizations correspond, and other personal users are displayed. The personal users comprise, for example, public users or college graduates users. The user can click on a node icon in the dendritic structure system so as to display a pull-down menu which comprises node attributes such as unfolding, retraction, movement and relation.

In addition, in the embodiment, the instant messaging list page further comprises a friend addition icon and a personal information icon. After the electronic device 100 detects the click operation on the friend addition icon by the user, identification code scanning equipment is started so as to scan the identification code of another user to be added as a friend. After the identification code of another user is successfully scanned, a friend addition request is initiated to the electronic device 100 of another user. In addition, after the click operation on the personal information icon by the user is detected, the personal information label of the user is displayed, wherein the personal information label comprises a personal business card option. After the operation on the personal business card option by the user is received, the identification code of the user is displayed. So, the identification code can be displayed to another user; and after the another user scans the identification code by the scanning equipment, the operation of adding the another user as a friend can be realized.

Figure 5:
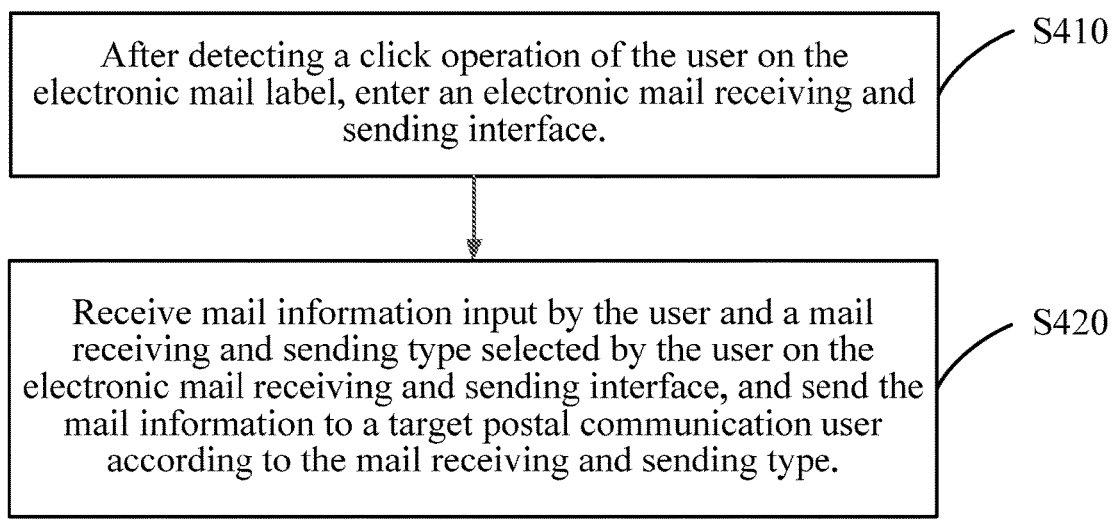
FIG. 5 is another flow diagram of the method for integrating multifunctional services according to one embodiment of the present application.

Further, referring to FIG. 5, in the embodiment, the method for integrating multifunctional services further comprises the following steps of:

Step 410, after detecting the click operation on the email label by the user, entering an email receiving and sending interface.

Step 420, receiving the mail information input by the user and a mail receiving and sending type selected by the user on the email receiving and sending interface, and sending the mail information to a target postal communication user according to the mail receiving and sending type.

In the embodiment, after the electronic device 100 detects the click operation on the email label in the personal homepage by the user, the email receiving and sending interface is entered. The email receiving and sending interface comprises, for example, an inbox icon, a starred icon, a sent icon, a junk email icon, a more information icon and the like. Emails which have been received in an inbox can be viewed by clicking on the inbox icon. The corresponding emails can be starred by clicking on the starred icon in the email list.

The user can input email information and selects an email receiving and sending type on the email receiving and sending interface. The electronic device 100 sends emails to a target postal communication user according to the email receiving and sending type selected by the user.

The email receiving and sending types comprise an unaddressed postal communication type and an addressed postal communication type. When the email receiving and sending type selected by the user is the addressed postal communication type, a postal communication address input by the user on the email receiving and sending interface is obtained, and the email information is sent to the target postal communication user to which the postal communication address corresponds. When the email receiving and sending type selected by the user is the unaddressed postal communication type, the email information is sent to the target postal communication user according to the personal business card of the target postal communication user selected by the user or an email receiving and sending link in the personal homepage of the user. So, the emails can be sent to the user in the unaddressed postal communication type without knowing the email address of an email receiving party and without disclosing your own email address, so as to ensure the security of personal information.

When the email sending is performed, the emails can be massively sent to contacts in the organization system in which the user is located. For example, the personal homepage to which subordinate nodes below their own nodes correspond can be selected in the dendritic structure system as an addressee object so as to realize the massive sending of the emails to all subordinate node users.

After the electronic device 100 detects the click operation on the more information icon by the user, the electronic device 100 displays an email sending and receiving related function menu, and the user enters a corresponding function interface by clicking the function menu. For example, the user can enter a function setting interface by clicking a setting icon in the function menu and can set account nickname, personalized signature, automatic reply, automatic forwarding, management of a blacklist and white list of a mailbox and the like. When the user sets automatic reply, the user can turn on or off automatic reply and can also edit the content of an automatic reply email. When the user sets automatic forwarding, the user can turn on or off automatic forwarding, and can edit email addresses to which the emails are automatically forwarded. When the user adds mailbox addresses to the blacklist, the user can input added mailbox addresses, and can select the mailbox addresses from the address book or the latest postal communication records so as to add the mailbox addresses to the blacklist. The emails sent by the mailbox addresses added to the blacklist can be set to be ignored or not reminded. Similarly, the user can add email addresses to the white list, and set the emails sent by the mailbox addresses added to the white list as key reminding, for example, setting reminding message, voice, music and the like so as to give priority to this kind of emails.

It shall be noted that the initiator of the above method can be an organization user, in addition, the initiator can also be a public user or a college graduate user, and the realization process for the public user or the college graduate user is similar to the realization process for the organization user serving as the initiator, except that the users of this class are not in a dendritic structure system. When the initiator is a public user or a college graduate user, the interaction process between the public user or the college graduate user and other users can refer to the above descriptions, and no descriptions are given in the embodiment.

Figure 6:
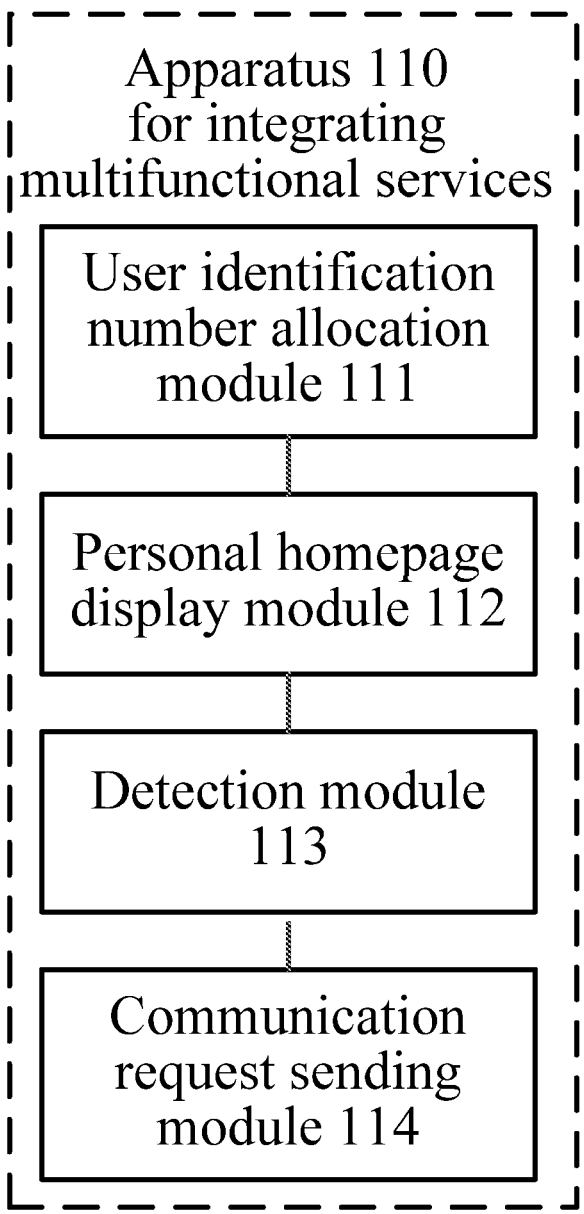
FIG. 6 is a function module block diagram of the apparatus for integrating multifunctional services according to one embodiment of the present application.

Referring to FIG. 6, the embodiment of the present application also provides an apparatus for integrating multifunctional services 110, which is applied to the electronic device 100 with the alternative application platform. The apparatus for integrating multifunctional services 110 comprises a user identification number allocation module 111, a personal homepage displaying module 112, a detecting module 113 and a communication request sending module 114.

The user identification number allocation module 111 is used for assigning users with corresponding user identification numbers in the interactive application platform, wherein the user identification number comprises multiple digital numbers. In the embodiment, for the description of the user identification number allocation module 111, reference can be made to the detailed description of the aforementioned step 110, namely, the step 110 can be executed by the user identification number allocation module 111, and therefore, no further explanation is repeated herein.

The personal homepage displaying module 112 is used for responding to the login operation when the login operation of the user based on the user identification number is detected, and displaying the personal homepage of the user after login is successful, wherein the personal homepage comprises a social information label, an instant messaging label, an audio and video communication label and an email label. In the embodiment, for the description of the personal homepage displaying module 112, reference can be made to the detailed description of the aforementioned step 120, namely, the step 120 can be executed by the personal homepage displaying module 112, and therefore, no further explanation is given herein.

The detecting module 113 is used for entering an audio and video communication interface after detecting a click operation of the user on the audio and video communication label. In the embodiment, for the description of the detecting module 113, reference can be made to the detailed description of the aforementioned step 130, namely, the step 130 can be executed by the detecting module 113, and therefore, no further explanation is repeated herein.

The communication request sending module 114 is used for initiating a communication request to another user based on the user identification number when the user identification number of the another user input by the user on a dialing sub-interface in the audio and video communication interface is received, or initiating a communication request to the another user to which a communication key corresponds when the click operation of the user on the communication key arranged on the audio and video communication interface is detected. In the embodiment, for the description of the communication request sending module 114, reference can be made to the detailed description of the aforementioned step 140, namely, the step 140 can be executed by the communication request sending module 114, and therefore, no further explanation is repeated herein.

In sum, according to the method for integrating multifunctional services and device, and the electronic device 100 provided by the embodiments of the present application, the interaction among platform users is more convenient by assigning the user identification numbers to the users in the interactive application platform and using the user identification numbers as a basis for the user to login to the platform and interact with other users in the platform. In addition, multiple different business functions are integrated into the interactive application platform according to the present application, so that multiple different information interaction can be realized among the users, and the disadvantage of the prior art that switching among multiple applications with different functions is needed to realize different interactive functions is avoided.

It should be appreciated that the disclosed apparatus and method may also be implemented in other manners. The embodiments of the apparatus and method described above are merely illustrative, but are not intended to limit the invention. For example, the flowchart and block diagram in the accompanying drawings show system architecture, functions and operations that are possibly implemented by the apparatus, method and computer program product according to the embodiments of the present invention. In this regard, each block in the flowchart or block diagram can represent a module, a program segment, or a part of code. The module, program segment or a part of code includes one or more executable instructions for implementing a specified function. It should also be noted that in some alternative implementations, functions indicated in the blocks can also take place in a sequence different from the sequence indicated in the drawing. For example, two successive blocks actually can be executed in a substantially parallel manner, or can be executed in a reverse sequence, which depends on the related functions. It should also be noted that each block in the block diagram and/or flowchart and a combination of blocks in the block diagram and/or flowchart can be implemented by using a dedicated hardware-based system for executing specified functions or actions, or can be implemented by a combination of dedicated hardware and computer instructions.

In addition, the functional modules in the embodiments of the present invention can be integrated together to form an independent part, or each functional module can exist alone, or two or more modules can be integrated to form an independent part.

When the function is implemented in the form of a software functional module and sold or used as an independent product, the function may be stored in a computer-readable storage medium. Based on such an understanding, the technical solution of the present invention essentially, or the part contributing to the prior art, or all or some of the technical solution may be embodied in the form of a software product. The computer software product is stored in a storage medium and includes several instructions for instructing a computer device (which may be a personal computer, an electronic device 10, a network device, or the like) to perform all or some of the steps of the methods described in the embodiments of the present invention. The foregoing storage medium includes: various media that can store program code, such as a USB flash disk, a mobile hard disk drive, a read-only memory (ROM), a random access memory (RAM), a magnetic disk, or an optical disc.

The foregoing descriptions are merely preferred embodiments of the present invention, but are not intended to limit the present disclosure. For a person skilled in the art, the present invention can have various modifications and changes. Any modification, equivalent replacement, or improvement made within the spirit and principle of the present disclosure shall fall within the protection scope of the present invention.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. A method for integrating multifunctional services, operably applied to an electronic device with an integrative application platform, comprising:
   assigning users with corresponding user identification numbers in the interactive application platform, wherein each of the user identification numbers comprises multiple digital numbers;
   when a login operation of a user based on the user identification number is detected, responding to the login operation, and displaying a personal homepage of the user after login is successful, wherein the personal homepage comprises a social information label, an instant messaging label, an audio and video communication label and an email label;

after detecting a click operation of the user on the audio and video communication label, entering an audio and video communication interface; and when a user identification number of another user input by the user on a dialing sub-interface is received, initiating a communication request to the another user based on the user identification number, or when a click operation of the user on a communication key arranged on the audio and video communication interface is detected, initiating a communication request to another user to which the communication key corresponds, wherein the interactive application platform comprises multiple users; the personal homepage related to each of the users is mapped to a dendritic structure system which is established according to the interior administrative management relationship of the organization in which each of the users is located; and the method further comprises:

when the click operation of the user on the social information label in the personal homepage is detected, jumping to a social information interface;

receiving shared information input and an information visible type selected by the user on the social information interface; and setting the shared information to be visible to at least a portion of users in the dendritic structure system according to the information visible type, and/or pushing the shared information to at least a portion of users in the dendritic structure system;

when the click operation of the user on an organization structure label in the social information interface is detected, displaying the dendritic structure system comprising multiple nodes, wherein the relationship among the multiple nodes is the mapping of interior administrative management relationships of multiple users in the organizations in which the multiple users are located;

receiving a control operation of the user on the nodes in the dendritic structure system and the selected target node, wherein the control operation is a movement operation or relating operation; and moving or relating the personal homepage and a subordinate homepage related to the nodes to the personal homepage of the target node according to the control operation.

2. A non-transitory computer-readable medium storing programs which, when executed by one or more processors, cause the method for integrating multifunctional services of claim 1 to be performed.

3. An electronic device, comprising:
at least one non-transitory computer-readable medium, and at least one processor, wherein the at least one non-transitory computer-readable medium stores executable instructions which, when executed by the at least one processor, cause the method for integrating multifunctional services of claim 1 to be performed.

4. A method for integrating multifunctional services, operably applied to an electronic device with an integrative application platform, comprising:
assigning users with corresponding user identification numbers in the interactive application platform, wherein each of the user identification numbers comprises multiple digital numbers;

when a login operation of a user based on the user identification number is detected, responding to the login operation, and displaying a personal homepage of the user after login is successful, wherein the personal homepage comprises a social information label, an instant messaging label, an audio and video communication label and an email label;

after detecting a click operation of the user on the audio and video communication label, entering an audio and video communication interface;

when a user identification number of another user input by the user on a dialing sub-interface is received, initiating a communication request to the another user based on the user identification number, or when a click operation of the user on a communication key arranged on the audio and video communication interface is detected, initiating a communication request to another user to which the communication key corresponds;

after detecting the click operation of the user on the instant messaging label, entering an instant messaging list page, wherein the instant messaging list page comprises an instant messaging record icon and a contact icon, and the instant messaging list page when the instant messaging record icon is in a click state; and after detecting the click operation on the contact icon, and displaying a dendritic structure system comprising multiple nodes, which is mapped by an organization in which the user is located, the dendritic structure systems to which other organizations correspond, and other personal users, wherein the instant messaging list page further comprises a friend addition icon and a personal information icon, and the method further comprises:

after detecting a click operation of the user on the friend addition icon, starting identification code scanning equipment, and after successfully scanning the identification code of another user, issuing a friend addition request to the another user; or after detecting a click operation of the user on the personal information icon, displaying a personal information label of the user, wherein the personal information label comprises a personal business card option; and receiving an operation of the user on the personal business card option, and displaying the identification code of the user.

5. The method according to claim 4, wherein the interactive application platform comprises multiple users; each of the users is mapped to the dendritic structure system that is established according to an interior administrative management relationship of an organization in which each of the users is located, wherein the user identification number comprises a first number segment, a second number segment and a third number segment; and the step of initiating a communication request to another user based on a user identification number when the user identification number of the another user input by the user on a dialing sub-interface in the audio and video communication interface is received comprises:

when the user and the another user are located in the same dendritic structure system, receiving a third number segment of the user identification number of the another user input by the user on the dialing sub-interface in the audio and video communication interface, and initiating a communication request to the another user based on the third number segment; and when the user and the another user are located in different dendritic structure systems, receiving a second number segment and a third number segment of the user identification number of the another user input by the user on the dialing sub-interface in the audio and video communication interface, and initiating a communication request to the another user based on the second number segment and the third number segment.

6. A non-transitory computer-readable medium storing programs which, when executed by one or more processors, cause the method for integrating multifunctional services of claim 4 to be performed.

7. An electronic device, comprising:
at least one non-transitory computer-readable medium, and at least one processor, wherein the at least one non-transitory computer-readable medium stores executable instructions which, when executed by the at least one processor, cause the method for integrating multifunctional services of claim 4 to be performed.

8. A method for integrating multifunctional services, operably applied to an electronic device with an integrative application platform, comprising:
assigning users with corresponding user identification numbers in the interactive application platform, wherein each of the user identification numbers comprises multiple digital numbers;
when a login operation of a user based on the user identification number is detected, responding to the login operation, and displaying a personal homepage of the user after login is successful, wherein the personal homepage comprises a social information label, an instant messaging label, an audio and video communication label and an email label;
after detecting a click operation of the user on the audio and video communication label, entering an audio and video communication interface;
when a user identification number of another user input by the user on a dialing sub-interface is received, initiating a communication request to the another user based on the user identification number, or when a click operation of the user on a communication key arranged on the audio and video communication interface is detected, initiating a communication request to another user to which the communication key corresponds;
after detecting a click operation of the user on the email label, entering an email receiving and sending interface; and
receiving the mail information input by the user and a mail receiving and sending type selected by the user on the email receiving and sending interface, and sending the mail information to a target postal communication user,
wherein the mail receiving and sending types comprise an unaddressed postal communication type and an addressed postal communication type, and the step of sending the mail information to the target postal communication user according to the mail receiving and sending type comprises:

when the mail receiving and sending type is the addressed postal communication type, obtaining a postal communication address input on the email receiving and sending interface, and sending the mail information to a target postal communication user to which the postal communication address corresponds; and when the mail receiving and sending type is the unaddressed postal communication type, sending the mail information to the target postal communication user according to the personal business card of the target postal communication user selected by the user or a mail receiving and sending link in the personal homepage of the user.

9. The method according to claim 8, wherein the interactive application platform comprises multiple users; each of the users is mapped to a dendritic structure system that is established according to an interior administrative management relationship of an organization in which each of the users is located, wherein the user identification number comprises a first number segment, a second number segment and a third number segment; and the step of initiating a communication request to another user based on a user identification number when the user identification number of the another user input by the user on a dialing sub-interface in the audio and video communication interface is received comprises:
when the user and the another user are located in the same dendritic structure system, receiving a third number segment of the user identification number of the another user input by the user on the dialing sub-interface in the audio and video communication interface, and initiating a communication request to the another user based on the third number segment; and
when the user and the another user are located in different dendritic structure systems, receiving a second number segment and a third number segment of the user identification number of the another user input by the user on the dialing sub-interface in the audio and video communication interface, and initiating a communication request to the another user based on the second number segment and the third number segment.

10. A non-transitory computer-readable medium storing programs which, when executed by one or more processors, cause the method for integrating multifunctional services of claim 8 to be performed.

11. An electronic device, comprising:
at least one non-transitory computer-readable medium, and at least one processor, wherein the at least one non-transitory computer-readable medium stores executable instructions which, when executed by the at least one processor, cause the method for integrating multifunctional services of claim 8 to be performed.

* * * * *